(12) United States Patent
Black

(10) Patent No.: US 10,099,122 B2
(45) Date of Patent: Oct. 16, 2018

(54) HEAD-MOUNTED DISPLAY TRACKING

(71) Applicant: SONY INTERACTIVE ENTERTAINMENT INC., Tokyo (JP)

(72) Inventor: Glenn T. Black, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/085,887

(22) Filed: Mar. 30, 2016

(65) Prior Publication Data
US 2017/0282062 A1 Oct. 5, 2017

(51) Int. Cl.
A63F 13/213 (2014.01)
A63F 13/34 (2014.01)
A63F 13/25 (2014.01)
G02B 27/01 (2006.01)
H04L 29/06 (2006.01)
A63F 13/428 (2014.01)
A63F 13/211 (2014.01)
A63F 13/323 (2014.01)
A63F 13/5255 (2014.01)
A63F 13/212 (2014.01)

(52) U.S. Cl.
CPC ............ *A63F 13/25* (2014.09); *A63F 13/211* (2014.09); *A63F 13/213* (2014.09); *A63F 13/323* (2014.09); *A63F 13/428* (2014.09); *G02B 27/017* (2013.01); *H04L 67/38* (2013.01); *A63F 13/212* (2014.09); *A63F 13/34* (2014.09); *A63F 13/5255* (2014.09); *A63F 2300/8082* (2013.01); *G02B 2027/014* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| 2012/0105473 | A1 | 5/2012 | Bar-Zeev et al. |
| 2014/0361956 | A1 | 12/2014 | Mikhailov et al. |
| 2015/0235426 | A1* | 8/2015 | Lyons ............... G02B 27/0172 345/8 |
| 2015/0268470 | A1 | 9/2015 | Yang |

FOREIGN PATENT DOCUMENTS

| WO | 2015/048890 | 4/2015 |
| WO | 2015/066037 | 5/2015 |
| WO | 2017/172193 A1 | 10/2017 |

OTHER PUBLICATIONS

International Application No. PCT/US2017/020036, "International Search Report," dated May 15, 2017, 3 pages.

* cited by examiner

Primary Examiner — Damon Pierce
(74) Attorney, Agent, or Firm — Martine Penilla Group, LLP

(57) ABSTRACT

A virtual reality (VR) head-mounted display (HMD), a computer-implemented method, and a VR tracking system are described. Generally, a VR HMD includes an inertial measurement unit (IMU) and an optical sensor. When a second VR HMD is located in a same physical environment, the VR HMD can be operated to track a motion of the second VR HMD in the physical environment. For example, image data captured by the VR HMD in addition to inertial data of both VR HMDs are used to determine a three dimensional (3D) physical position of the second VR HMD and to track the 3D physical position over time. Three degrees of freedom (DOF) or six DOF for the motion are derived from the tracking.

20 Claims, 11 Drawing Sheets

HEAD-MOUNTED DISPLAY TRACKING

CROSS-REFERENCES TO RELATED APPLICATIONS

NOT APPLICABLE

BACKGROUND

Virtual reality (VR) head-mounted displays (HMDs) are used for different applications. For example, a user wears and operates a VR HMD to view VR content. Typically, the VR content is presented at a an audio and video system of the VR HMD. The VR content includes video games, movies, virtual meetings, or other online and offline content.

Generally, a VR HMD enables an immersive user experience that, over time, has increased in realism, visual appeal, and complexity. For example, the VR HMD transports a user into a virtual world where the user is represented as a virtual user. The user's motion in the physical world moves the virtual user in the virtual world. In response to a motion, VR content is updated to provide the immersed virtual world experience. Accordingly, motion tracking is crucial to give a sense of immersion and presence in the virtual world.

Existing VR motion tracking systems typically follow one of two approaches. In a basic approach, motion tracking of a user operating a VR HMD is solely performed by the VR HMD. This approach involves the least amount of VR tracking equipment and can be easily deployed. In another approach, more complex systems are involved. Such systems include motion tracking devices that are stationary in physical environment. As the user moves around the physical environment, the motion tracking devices detect the motion and send related information to the VR HMD. Although the motion tracking is very accurate, such systems involve more complex VR tracking equipment.

However, no existing VR motion tracking system achieves a high tracking accuracy (e.g., similar or substantially close to the accuracy of a complex system), while relying on less complex equipment.

BRIEF SUMMARY

Generally, a VR HMD is described. In an example, the VR HMD includes an inertial measurement unit (IMU) and an optical sensor, among other components. The VR HMD is configured to track a motion of a second VR HMD based on capabilities of the IMU and optical sensor.

In addition, computer-implemented methods and a VR tracking system are described. Generally, the VR HMD is operated to track the motion of the second VR HMD. In an example, the motion includes three degrees of freedom (DOF) or six DOF motion and is tracked based on changes over time to a three dimensional (3D) position of the second VR HMD in a physical environment. For instance, the VR HMD receives position data, such as inertial data, from the second VR HMD. The VR HMD also captures images of the physical environment. The second VR HMD is identified in the images. The images and the position data are further analyzed to determine the 3D position and to track the changes over time.

Furthermore, position data can be received from multiple VR HMDs. The respective 3D positions in the physical environment are accordingly derived. In an example, the 3D positions are mapped to 3D virtual positions in a virtual environment based on a physical-to-virtual space mapping. VR content presented at the VR HMDs can be controlled, in part, based on the 3D virtual positions.

A computer system is configured to perform the computer-implemented methods. The computer system is a component of a VR HMD, a VR tracking system, a central computer, or is distributed between VR HMD the VR tracking system and the central computer.

In an example, a computer-implemented method includes multiple operations. In one operation, the computer system accesses position data of a first VR HMD. The position data is generated based on image data of a physical environment that comprises the first VR HMD. The image data is generated by an optical sensor of a second VR HMD. In another operation, the computer system determines a position of the first VR HMD in the physical environment based on the position data. In yet another operation, the computer system causes a presentation of VR content at the first VR HMD based on the position in the physical environment.

In an example, another computer-implemented method also includes multiple operations. In one operation, the computer system accesses position data of a VR HMD that is located in a physical environment. The position data is generated based on inertial data and image data. The inertial data indicates a movement in the physical environment of an optical sensor that is remote from the VR HMD. The image data is generated by the optical sensor and corresponds to an image of the VR HMD in the physical environment. In another operation, the computer system determines a position of the VR HMD in the physical environment based on the position data. In yet another operation, the computer system causes a presentation of virtual reality content at the VR HMD based on the position in the physical environment.

In an example, another computer-implemented method also includes multiple operations. In one operation, the computer system determines a first position of a first VR HMD in a physical environment. The first position is determined based on second position data generated based on a second optical sensor of a second VR HMD. In another operation, the computer system determines a second position of the second VR HMD in the physical environment. The second position is determined based on first position data generated based on a first optical sensor of the first VR HMD. In yet another operation, the computer system causes presentations of VR content at the first VR HMD and the second VR HMD based on the first position and the second position in the physical environment.

A further understanding of the nature and the advantages of the embodiments disclosed and suggested herein may be realized by reference to the remaining portions of the specification and the attached drawings.

DETAILED DESCRIPTION

Generally, systems and methods for VR motion tracking are described. Typically, a user operates a VR HMD to access VR content. The access is controlled, at least in part, by the user's motion in a physical environment. Three dimensional (3D) positions in the physical environment define the physical motion. The 3D positions are mapped to 3D positions in a virtual environment. The virtual 3D positions define the user's virtual motion in the virtual environment. The access to the VR content is facilitated based on the virtual motion. For instance, if the user motions his or head from left to right, the VR content is refreshed to mimic a similar motion in the virtual environment.

In an example, the VR motion tracking involves at least two VR HMDs. For instance, two users are co-located in a physical environment. The first user operates a first VR HMD to access VR content. Similarly, the second user operates a second VR HMD to access the same or different VR content. Each of the VR HMDs includes an inertial measurement unit (IMU) and an optical sensor (e.g., a component of a camera of the VR HMD). Hence, each of the VR HMDs can be used as a motion tracker of the other VR HMD based on the IMUs and optical sensors. In other words, the first VR HMD tracks the motion of the second VR HMD and provides information about this motion to the second VR HMD. The second VR HM can do the same with respect to the first VR HMD.

For instance, at one time, the first VR HMD receives position data, such as inertial data, from the second VR HMD. This position data is captured by the IMU of the second VR HMD. The first VR HMD also captures image data of the second VR HMD based on the optical sensor of the first V HMD. Based on the position data and the image data, the first VR HMD derives a 3D physical position of the second VR HMD. That position is sent to the second VR HMD. The second VR HMD translates the 3D physical position into a 3D virtual position. The 3D physical position is tracked over time, thereby enabling motion tracking.

The above examples are provided for illustrative purposes. The embodiments of the present disclosure are not limited as such. The embodiments similarly apply to a larger number of VR HMDs, to different types of data that can be exchanged between VR HMDs, to mobile tracking devices other than VR HMDs, and/or to data processing at a central computer system. These and other embodiments are further described herein next.

Figure 1:
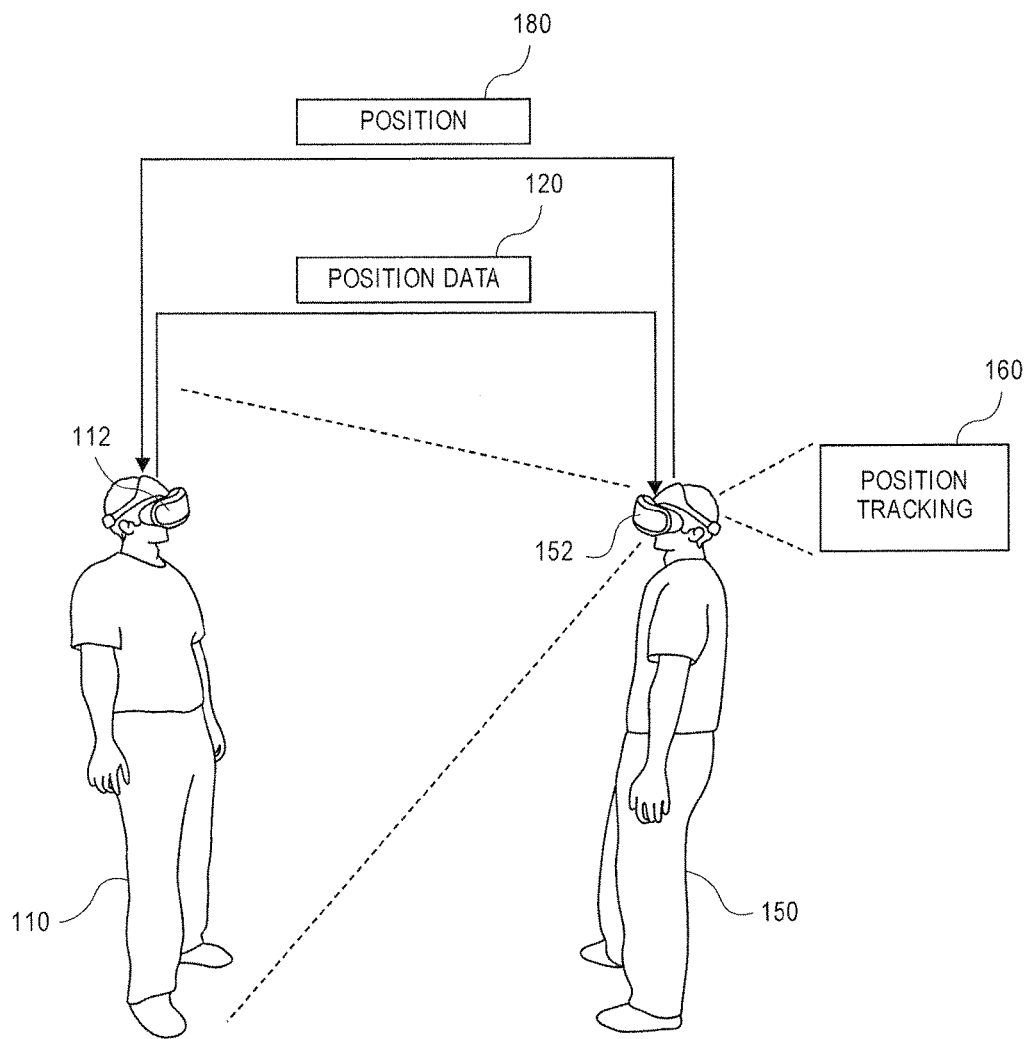
FIG. 1 illustrates an example VR motion tracking that involves a number of VR HMDs, according to embodiments of the present disclosure.

FIG. 1 illustrates an example VR motion tracking that involves a number of VR HMDs. In an example, a user 110 operates a VR HMD 112. Another user 150 similarly operates a VR HMD 152. Although two VR HMDs are illustrated, a larger number can also be used. Additionally, in the interest of clarity of explanation, the user 150 is referred to herein as a tracker 150 and VR HMD 152 as a tracker device 152 because the VR HMD 152 is configured to track the motion of the user 110.

Generally, the motion tracking involves monitoring changes to a 3D physical position of the VR HMD 112 over time. Position tracking is used herein to refer to tracking 3D physical positions of the VR HMD 112 over time. The collection of the tracked 3D physical positions represents the motion tracking. Typically, position tracking (and, equivalently, motion tracking) involves processing of position data and image data. Position data refers to data that represents a 3D physical position. Image data refers to data that represents an image of a physical environment.

In the illustrative example of FIG. 1, the tracker 152 tracks the 3D physical position 180 of the user's 110, such as the user's 110 head. The 3D physical position 180 is sent to the VR HMD 112 over a data network to control the access to VR content. The VR HMD 110 can also track and provide the position of the tracker 150 when the VR HMD includes similar components as the ones in the tracker device 152. The data network includes a peer-to-peer data communication network, such as one using Bluetooth®, WiFi, or other wireless technologies. Other types of data networks are also possible, such as one that uses a local area network (LAN).

In an example, the VR HMD 112 includes an IMU and a signal processor for generating position data 120 of the tracker device VR HMD 112. The position data 120 can define, over time, motion along three degrees of freedom (DOF), such as a rotational motion (e.g., roll, yaw, and pitch), or six DOF, such as translational motion (e.g., along the X, Y, Z axes) and rotational motion.

For instance, the IMU includes accelerometer(s), gyroscope(s), and magnetometer(s). An accelerometer(s) measures movement along the X,Y,Z axes. Generally, a gyroscope(s) measures three-hundred sixty degree rotation. A magnetometer(s) determines orientation towards a magnetic field. As such, inertial data indicative of a rotational motion of the user 110 (e.g., the user's head where the VR HMD 112 is mounted) can be generated from the readings of these sensors. Translational motion can also be generated based on additionally speed and time of the user's 110 head motion. For instance, a motion vector is defined. Speed is measured from the acceleration and distance is measured as a function of speed and time. Direction is derived from the rotation and orientation. The motion vector defines the distance and direction of the motion, thereby allowing a tracking of the translational motion of the user's 110 head along the X, Y, and Z axes. Thus, by defining inertial data, distance, and direction in a motion vector, the motion of the user's head 110 can be tracked over time along six DOF. Each point in time corresponds to a 3D physical position 180.

The tracker device 152 also includes an IMU and a signal processor to generate the position data of the tracker 150. Similarly here, the position data can represent the rotational motion, the translational motion, or both the rotational and translational motions of the tracker's 150 head.

In an addition, the tracker device 152 includes an optical sensor (or, more generally, a camera) for capturing image data (or, more generally, generating images). The image data is used along with different proximity data to track the 3D physical position 180 over time, and thereby motion. Different tracking techniques are possible and are further described herein below.

In an example tracking technique, the tracker device 152 is configured to perform a position tracking 160 of the user's 110 position, such as the user's 110 head. In this example, the tracker device 152 receives the position data 120 of the user 110, such as the user's 110 inertial data, at different times (e.g., every few milliseconds). The tracker device 152 also generates image data that represents images of a physical environment that includes the user 110. The image data is generated at also the different times based on a time synchronization between the VR HMD 112 and the tracker device 152. A 3D physical position 180 of the VR HMD 112 at each of the times (and, thus, the motion over time) is determined from the proximity data 120 and the image data. In addition, because the tracker device 152 may also be in motion (e.g., based on the tracker's 110 motion), the tracker device 112 accesses its own inertial data to offset its own motion and improve the accuracy of the position tracking 160.

In an illustration of this example technique, the tracker device 152 implements different image processing techniques, such as pattern recognition, edge detection, and other image-related analysis to identify the VR HMD 112 from the image data. The tracker device 152 also applies geometric reconstruction to the image data based on the inertial data to determine the 3D physical position 180 of the VR HMD 112 over time. Generally, the geometric reconstruction includes determining distances, angles, directions, orientations, and/or other geometric properties between two or more points (such as between two points that represent the VR HM 112 and the VR HMD 152, respectively). Some of the properties are determined from an analysis of a single image, whereas the analysis of other properties span multiple images.

In an illustration, the directional speed of the VR HMD 112 is determined from the inertial data received as part of the position data 120. Similarly, the directional speed of the tracker device 152 is determined from local inertial data. An offset directional speed is determined from the two directional speeds. The change in pixel location of the VR HMD 112 in two images, the timing of the images, and the offset directional speed indicate a traveled distance and a direction of the traveled distance. The traveled distance is mapped to changes in the image pixels. The mapping represents a pixel resolution scale usable to detect depths and proximities in the images. Depth is used to detect the 3D physical position 180 of the VR HMD 112 along the X, Y, and Z axes in each image and the X, Y, Z, and rotational changes to the 3D physical position 180 across the images. Proximity is used to detect the proximity (e.g., in distance and direction) of the VR HMD 112 to other objects in the physical environment (e.g., to other potential obstacle and/or to the tracker device 152).

In another example tracking technique, the position tracking 160 is offloaded to the VR HMD 112. In this example, the tracker device's 112 inertial data and the captured image data are sent to the VR HMD 112. In turn, the VR HMD 112 applies image processing techniques and geometric reconstructions, similarly to the above, to track the 3D physical position 180 over time.

In yet another example tracking technique, the position tracking 160 is distributed between the tracker device 152 and the VR HMD 112. For instance, rotational motion is tracked locally at the VR HMD 112 from the inertial data of the VR HMD 112. In comparison, translational motion is tracked remotely at the tracker device 152 based on the captured image data. The tracker device 152 sends the translation motion to the VR HMD 112, thereby supplementing the translational motion such that the VR HMD 112 can determine the user's 110 motion along six DOF.

In a further example tracking technique, the 3D physical position 180 (whether generated by the tracker device 152 or the VR HMD 112) is used for calibration to improve the fidelity and accuracy of local position measurements. For instance, the VR HMD 112 locally measures its own 3D physical position from the position data 120 at a point in time. That position is compared to the 3D physical position 180 at that point in time (generated in part based on the image data) to determine a calibration offset. The VR HMD 112 uses the calibration offset to correct subsequent local measurements of the 3D physical location, thereby correcting sensor drifts.

In addition to the positioning tracking 160, the position data 120, the captured image data, and the inertial data local to the tracker device 152 are used to detect proximities of the VR HMD 112 to potential obstacles and/or the tracker device 152 (e.g., the tracker 150) as explained herein above. Proximity data can provide awareness to the user 110 about the physical environment, such that the user 110 can avoid collisions with objects (e.g., potential obstacles or the tracker 150). If a proximity to an object falls below a threshold, a proximity indication is generated and presented at the VR HMD 112 using different presentation modalities (e.g., tactile, audible, and visual presentations). If the object includes the tracker 152, the proximity indication can also be presented at the tracker device 152. In an example, the proximity indication identifies a distance and a direction to the object. In addition, the proximity indication suggests a motion to avoid the collision with the object. For instance, the proximity indication suggests a motion in the opposite direction as the current motion of the user 110.

Various techniques are also available to define the threshold. In an example, the threshold is static and defined based on, for instance, the measurement accuracy. In another example, the threshold is defined based on user input. For instance, the user 110 sets up a preference about threshold distances from objects. The preference can be stored in a user profile local or remotely accessible to the VR HMD 112. In yet another example technique, the threshold is defined based on usage of the VR HMD 112 or type of VR content. For instance, certain video games or content necessitate little movement of the user 110 (e.g., a chess video game), whereas video games or content necessitate more movement (e.g., a sports video game). In the former case, the threshold can be defined as a large distance because the user 110 is not expected to move much. In the latter case, the threshold can be defined as a small distance because the user 110 is expected to need a larger space.

Although FIG. 1 illustrates the tracker device 152 and a VR HMD, other types of mobile computing devices can similarly be used. For example, the tracker 150 operates a mobile device (e.g., a smart phone, a tablet, or some other portable end user device). If the mobile device includes position tracking components, such as an IMU and an optical sensor, the above position tracking 160 can be implemented. For instance, the implementation adds a software application to the mobile device to generate position data and image data based on the IMU and optical sensor, respectively, and perform the position tracking 160 based on this data.

In addition, although FIG. 1 illustrates a peer-to-peer communication between the VR HMD 112 and the tracker device 152 and data processing distributed between the two components, a central computer can also be used. In an example, the VR HMD 112 and the tracker device 152 are in data communication with the central computer. The central computer can be located in the physical environment that contains the VR HMD 112 and the tracker device 152 (e.g., the central computer is a desktop or a video game console) or can be remote from the physical environment (e.g., can be a cloud-based computing service). The data communication occurs over a LAN, a private network (e.g., an Intranet), or a public network (the Internet). Generally, the central computer manages position tracking. For instance, the central computer, receives position data from the VR HMD 112 and/or the tracker device 152, image data from the tracker device 152, tracks the 3D physical position 180 over time, detects proximities, sends 3D physical position 180 and proximity indications to the VR HMD 112, and/or controls access of the VR HMD 112 to VR content based on 3D physical position 180 and/or proximity indications.

More than two users can also be simultaneously present in the physical environment. Position tracking of a single user can be performed by one or more of the VR HMDs of the other users or, as applicable, by a central computer in data communication with such VR HMDs. Each of the other VR HMD can be configured as a tracker device 152. Generally, the higher the number of tracker devices 152 tracking the position of a user over time, the more accurate the tracked position is.

Figure 2:
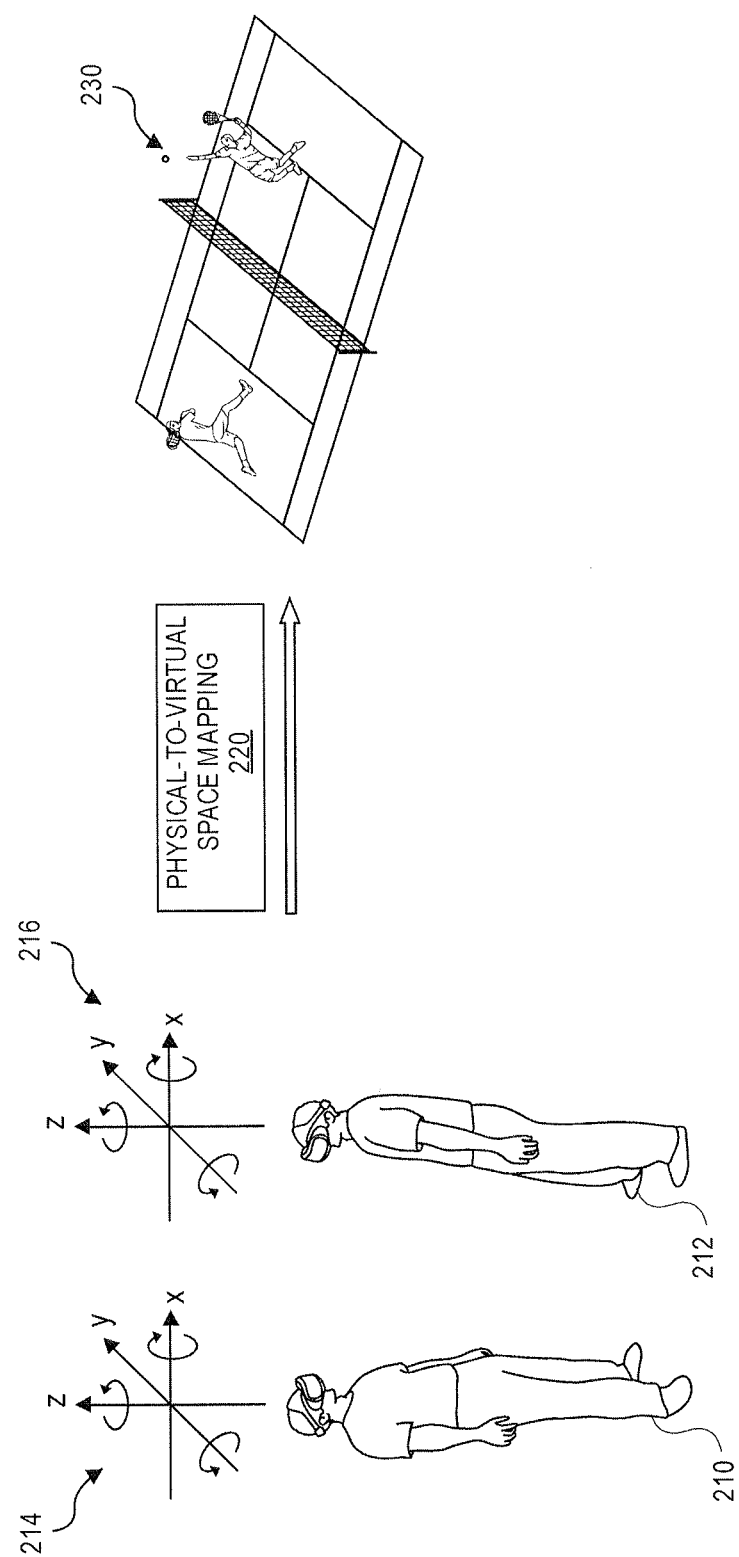
FIG. 2 illustrates a physical-to-virtual space mapping that facilitates access to VR content based on tracked positions in a physical environment, according to embodiments of the present disclosure.

FIG. 2 illustrates a physical-to-virtual space mapping that facilitates access to VR content based on tracked positions in a physical environment. As illustrated, two users 210 and 212 are present in the physical environment. Each user operates a respective VR HMD. The VR HMDs are configured to track the positions of the users 210 and 212 in the physical environment, similarly to the position tracking described in connection with FIG. 1.

In particular, the first user's VR HMD tracks a 3D physical position 216 of the second user 212. The 3D physical position 216 is tracked over time to define translational and/or rotational motions of, for example, the second user's head where the second VR HMD is mounted. Similarly, the second user's VR HMD tracks a 3D physical position 214 of the first user 210 over time.

In an example, a physical-to-virtual space mapping 220 is used to control access for or the presentation of VR content at each of the VR HMDs. Generally, the physical-to-virtual space mapping 220 maps a 3D physical position in the physical environment to a 3D virtual position in a virtual space. As such, translational and/or rotational motions in the physical environment can be mapped to motions in the virtual environment.

Different types of physical-to-virtual space mapping 220 are available. In an example, a one-to-one mapping is used, where a translational motion along a direction is mapped to a similar virtual translational motion and where a rotational motion along the direction is also mapped to a similar virtual rotational motion. Hence, if the user 210 moves his or her head from left to right in the physical environment, the presented VR content gives the user 210 the perception that the VR content (or, equivalently, a projection of the user (in the virtual environment e.g., a respective virtual user)) is also moving from left to right. This mapping can also use a scale. For instance, for each change in position of the user 210 takes in the physical environment, a scaled change in position is provided in the virtual environment. To illustrate, assume that the VR content presents a virtual room. For each step forward that the user 210 takes in the physical environment, the virtual user is moved by ten feet forward (or some other distance amount) in the virtual room. Other types of mapping are possible depending on the VR content. For example, a translational motion in one direction can be mapped to a rotational direction in another direction.

In addition, the physical-to-virtual space mapping 220 need not but can be specific to the VR content. Thus, if the users 210 and 212 are accessing the same VR content, the same physical-to-virtual space mapping 220 is applied. Additionally, the physical-to-virtual space mapping 220 need not but can be specific to each user. For instance, the scale varies dependently on dimensions and/or preferences of a user. Continuing with the above illustration, whereas ten feet forward in the virtual room correspond to a step of the user 210 in the physical environment, this virtual distance corresponds to two steps of the other user 212.

In an example, the physical-to-virtual space mapping 220 also positions the 3D virtual positions of the users (e.g., the respective virtual users in the virtual environment) relative to each other in the virtual environment. In this example, when the first user 210 is viewing the VR, the VR content presents to the first user 210 the virtual position of the second virtual user (corresponding to the second user 212). For instance, if the second user 212 is to the right of the first user 210 and the first user 210 turns his or her head to the right, the second virtual user (or an indication of the respective virtual position) can be viewed in the VR content presented to the first user 210 as being to the right of the first virtual user. In an example, this relative positioning facilitates a multiplayer video game where the virtual players are in the different locations in the virtual environment of the multiplayer video game. For instance, in a tennis video game, two virtual players can be positioned and moved on a virtual tennis court depending on the 3D physical positions 214 and 216 of the two users 210 and 212.

The relative positioning via the physical-to-virtual space mapping 220 can be based on dead reckoning or on ground truth. In a dead reckoning example, the 3D physical positions 214 and 216 are not anchored to a reference point in the physical environment. In comparison, the respective 3D virtual positions are defaulted to some default reference point(s) in the virtual environment. As the 3D physical positions 214 and 216 change over time, the 3D virtual positions are moved relative to the default reference point(s).

In this example, proximity can be determined in addition to positioning. For instance, if the 3D virtual positions indicate that the virtual users have traveled by a certain distance away from the default reference point(s) or towards each other, a proximity alert can be generated. In another illustration, if the 3D physical positions indicate that the traveled distance in the physical space by any or both users 210 and 212 is too large (e.g., exceeding a threshold) or that the two users 210 and 212 are on a collision course, a proximity alert can also be generated.

On the other hand, ground truth enables the relative positioning to be anchored to a specific reference point(s). In other words, ground truth provides an estimate of the 3D physical positions 214 and 216 of the users 210 and 212 relative to the physical environment. As further illustrated in FIG. 5, a proximity device can be located in the physical environment and used as the reference point. This reference point can also be mapped in the physical-to-virtual space mapping 220 to a reference point in the virtual environment. The 3D virtual positions can be anchored to that reference point. For instance and continuing with the tennis video game illustration, the proximity device can be located in a center (or some other physical location) of a play room. That the physical-to-virtual space mapping 220 maps that physical reference point to the center of the virtual tennis court.

In the ground truth example, the proximity device monitors the proximity of the users 210 and 212 to each other or to an obstacle. Accordingly, proximity alerts are sent to the VR HMDs to alert the users 210 and 212.

Figure 3:
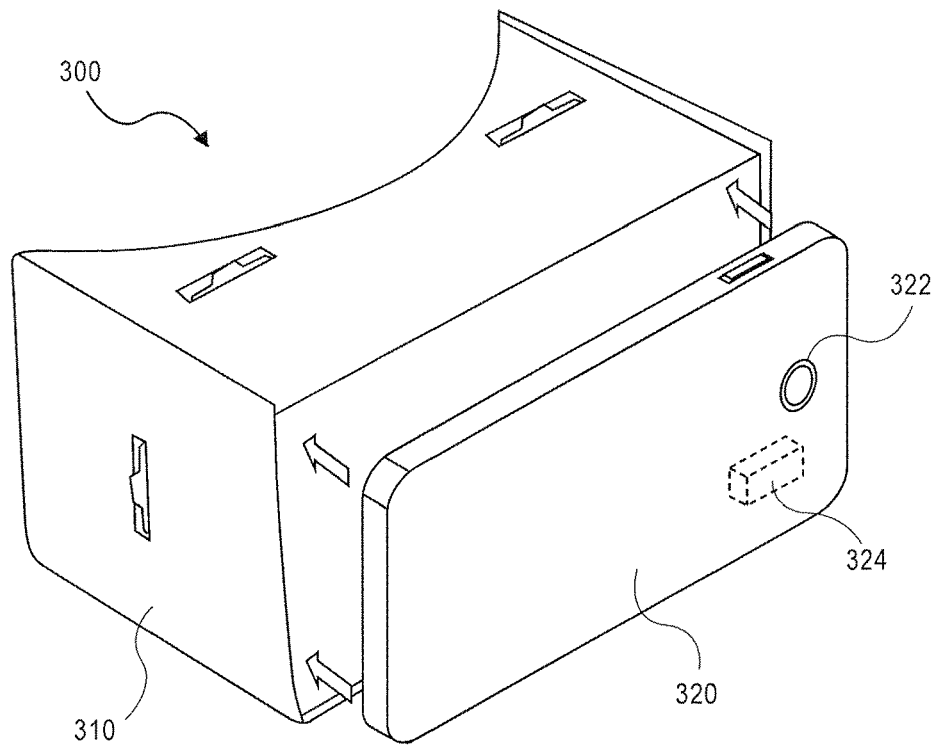
FIG. 3 illustrates example components of a VR HMD, according to embodiments of the present disclosure.

FIG. 3 illustrates example components of a VR HMD 300. The VR HMD 300 represents a basic configuration with a low degree of component integration that, nonetheless, facilitates positioning tracking. In particular, the VR HMD 300 includes a housing 310 and a mobile device 320 that is detachable from the housing 310.

The housing 310 can be made of different materials including, for example, cardboard or plastic. Lenses and a strap can also be included in the housing 310. The lenses are configured to enable the viewing of content displayed on a display of the mobile device 310 in a VR-like mode. The strap is configured to secure the housing 310 on a head of a user.

The housing 310 also includes an interface, such as a mechanical interface, configured to attach housing 310 and the mobile device 320. In an example, the mechanical interface is an enclosure, a pocket, an opening, a cavity where the mobile device 320 can be place.

The mobile device 320 represent an end user device that is mobile, such as a smart phone. In an example, the mobile device 320 includes an optical sensor 322 of a camera. The mobile device 320 also includes an IMU 324.

Figure 4:
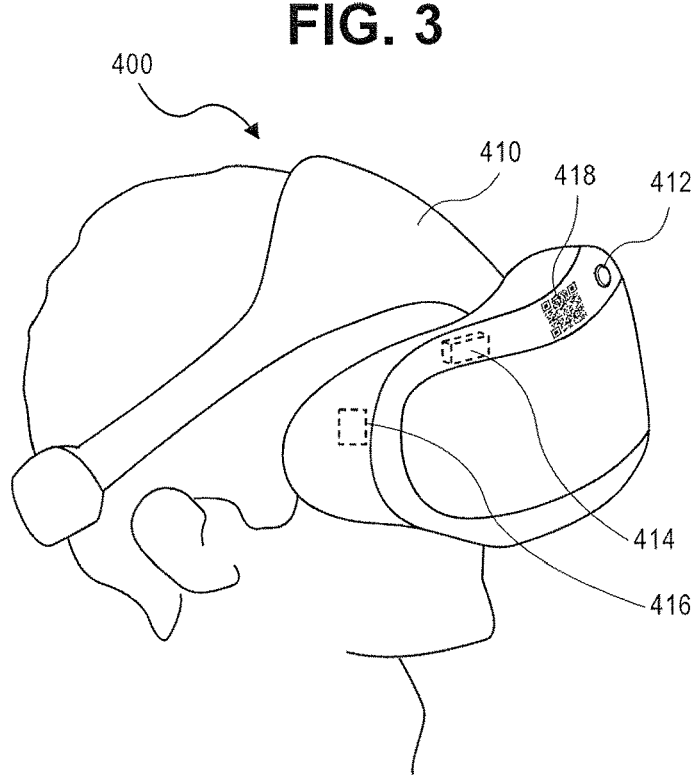
FIG. 4 illustrates example components of another VR HMD, according to embodiments of the present disclosure.

FIG. 4 illustrates example components of a VR HMD 400. In comparison to VR HM 300, the VR HMD 400 represents a configuration that has a higher degree of component integration and that facilitates positioning tracking. In particular, the VR HMD 400 includes a housing 410 that integrates VR-related components such as a display, processing units, memories, audio systems, input/output (I/O) ports, graphics processing units, and other electronic, electrical, and mechanical components. The housing 410 further integrates (e.g., houses, attaches, or holds) additional components for positioning tracking, such that the additional components are rigidly connected with the housing 410. These components include, for instance, an optical sensor 412, an IMU 414, a transceiver unit 416, and a reflector unit 418.

In an example, the optical sensor 412 can be part of a camera. Remaining components of the camera are housed within the housing 410 and coupled with other components of the VR HMD 400. In an example, the optical sensor 412 captures image data in the visible spectrum. In another example the optical sensor 412 is an infrared (IR) sensor.

In an example, the IMU 414 includes accelerometer(s), gyroscope(s), and magnetometer(s). A processing unit of the IMU 414 and/or the VR HMD 400 (e.g., a central processor) generates position data from data sensed by such sensors.

The image data and the position data (in addition to received position data of another VR HMD) are used for the positioning tracking. For instance, the central processor performs the positioning tracking.

In an example, the transceiver 416 transmits a signal that identifies the VR HMD 400 to another computing device, such as another VR HMD or a proximity device. In addition, proximity to the computing device is sensed based on the same signal or another transmitted signal. For instance, the transceiver 416 transmits an acoustic signal. In response, the computing device receives an attenuated acoustic signal. Based on acoustic attenuation, the computing device measures the proximity. The proximity is sent from the computing device to the VR HMD 400 over a data network. In this example, the transceiver 416 can be implemented as only a transmitter. Proximity measurement in the other way around is also possible. In particular, the transceiver 416 receives an attenuated acoustic signal in response to an acoustic signal transmitted from the computing device. Accordingly, the VR HMD 400 measures the proximity. In this example, the transceiver 416 can be implemented as only a receiver.

In an example, the reflector unit 418 reflects light in the visible or in an invisible spectrum (e.g., IR spectrum). Generally, the housing 410 attaches the reflector unit 418 on an external surface of the housing 410. A camera device (or, an optical sensor) of another computing device, such as another VR HMD or a proximity device) captures an image of the reflector unit 418. The image is analyzed to determine positioning and/or proximity.

For instance, the reflector unit 418 represents a tag that encodes two-dimensional machine-readable (e.g., a two dimensional bar code). Along one dimension, the reflector unit 418 encodes an identifier of the VR HMD 400, such that the computing device can identify the VR HMD from the image. Along the other dimension, the reflector unit 418 also encodes a scale (e.g., a proportional dimension of the reflector unit 418, such as the reflector unit's 418 diagonal). Thus, the computing device identifies the scale from the image analysis. The scale is mapped to a pixel resolution scale, thereby facilitating geometric reconstruction for positioning and proximity tracking based on image data. Other examples of the reflector unit 418 are also possible and includes a radio frequency identification (RFID) tag.

Figure 5:
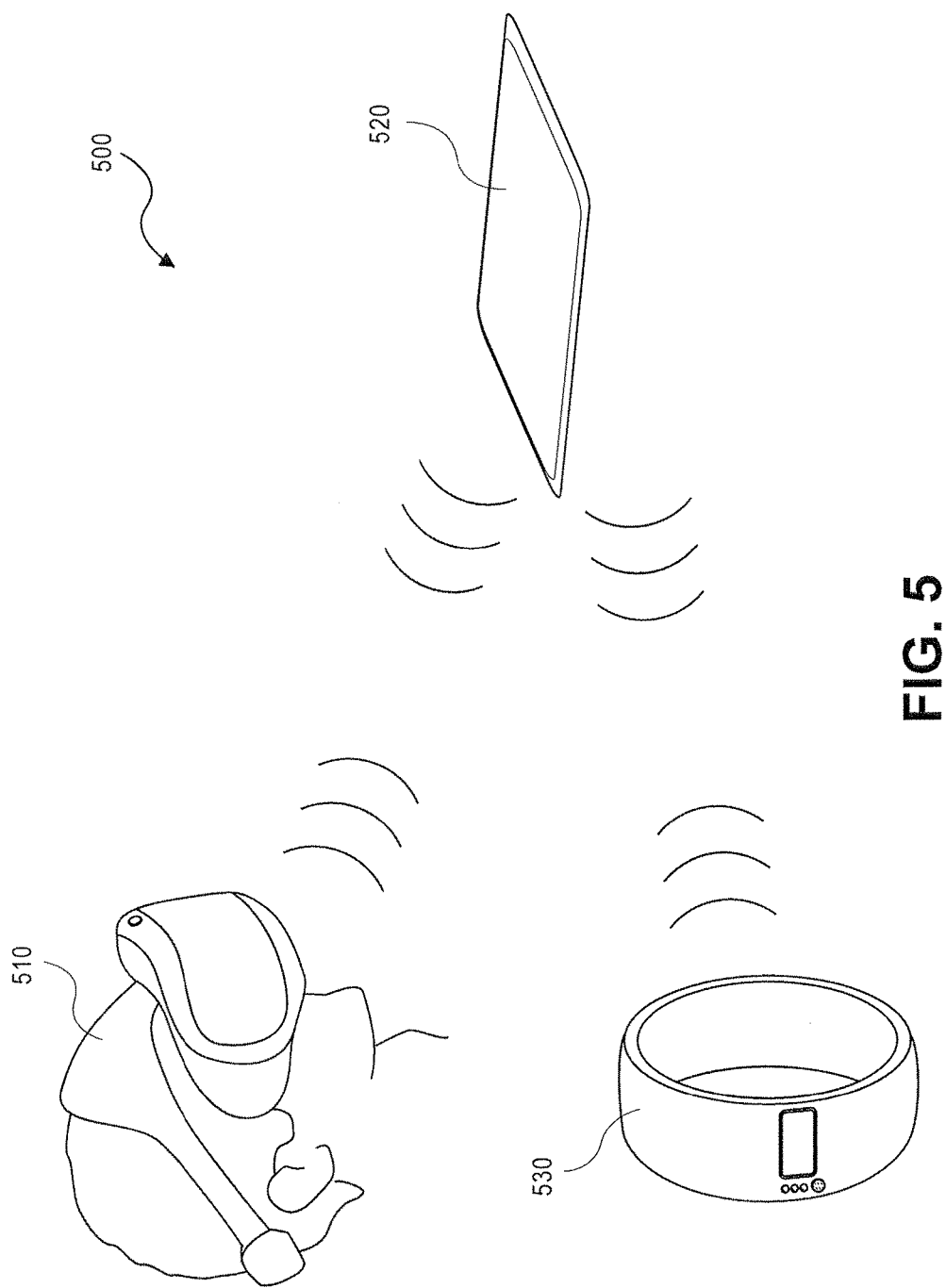
FIG. 5 illustrates an example system that includes a VR HMD, a proximity device, and a wearable gesture device, according to embodiments of the present disclosure.

FIG. 5 illustrates an example system 500 that includes a VR HMD 510, a proximity device 520, and a wearable gesture device 530. The different devices can exchange data over one or more data networks and other communication networks. The data supports position tracking based on ground truth. The data also supports proximity and gesture sensing as further described herein next.

In an example, the VR HMD 510 includes some or all of the components of VR HMD 400 described in connection with FIG. 4. For instance, the VR HMD 510 includes an optical sensor, an IMU, a transceiver, and/or a reflector unit.

The proximity device 520 is configured to provide ground truth and proximity sensing functionality. For example, the proximity device 520 is located at a particular location in a physical environment. That location is used as a reference point for ground truth. In addition, the proximity device 520 measures the proximity (e.g., distance and direction) of the VR HMD 510 to the reference point and/or to a perimeter of an area within the physical environment. The area represents an area within which proximity is monitored by the proximity device 520. Approaching the perimeter (e.g., being at a threshold distance away from the perimeter) triggers the proximity device 520 to generate a proximity alert.

Different configurations of the proximity device 520 are possible. Example configurations are described in co-pending U.S. patent application Ser. No. 15/085,879 filed Mar. 30, 2016, now U.S. Pat. No. 9,779,605 issued Oct. 3, 2017, filed concurrently herewith and entitled "VIRTUAL REALITY PROXIMITY SENSORS", which is incorporated herein by reference in its entirety.

In an example, the proximity device 520 is configured as an active device. An active device refers to necessitating some degree of active interaction with another device. For example, the proximity device 520 receives an attenuated signal. The attenuated signal represents a signal that the VR HMD 510 transmitted and that was attenuated in the physical environment. The proximity device 520 determines the proximity of the VR HMD 510 to the proximity device 520 and/or the perimeter based on the attenuation. In another illustration, the proximity device 520 includes a number of proximity sensors to measure the proximity based on signals transmitted from the proximity device 520 and signals reflected from a user of the VR HMD 510 (or from the VR HMD 510). For instance, these signals include any of radio frequency (RF), IR, acoustic, or LiDAR signals. The proximity is determined based on strength, time of flight, and/or Doppler effects of the signals.

In another example, the proximity device 520 is configured as a passive device. A passive device refers to a non-active device. For example, the proximity device 520 represents a reflector unit that encodes a scale (e.g., similarly to the reflector unit 418 of FIG. 4). In this example, the VR HMD 510 determines the proximity based on geometric reconstruction applied to images that contain the proximity device 520.

On the other hand, the wearable gesture device 530 is configured to provide gesture sensing functionality. In an example, the wearable gesture device 530 is located at a particular point on the user of the VR HMD 510. For instance, the user wears the wearable gesture device 530 on his or her wrist or ankle. User gestures at that particular point is monitored by a computing device, such as the VR HMD 510, the proximity device 520, or another VR HMD of another user, and relayed to the VR HMD 510.

Different configurations of the wearable gesture device 530 are possible. In one example, the wearable gesture device 530 includes a reflector unit that encodes a scale (e.g., similarly to the reflector unit 418 of FIG. 4). In this example, the computing device determines the distance and direction of the wearable gesture device 530 based on geometric reconstruction applied to images that contain the wearable gesture device 530. The distance and direction are tracked in a motion vector over time. The motion vector defines gesture data (e.g., defined as directional distance and speed).

In another example, the wearable gesture device 530 is an active device that transmits a signal. The computing device analyzes the respective attenuated signal and accordingly generates the motion vector over time.

Figure 6:
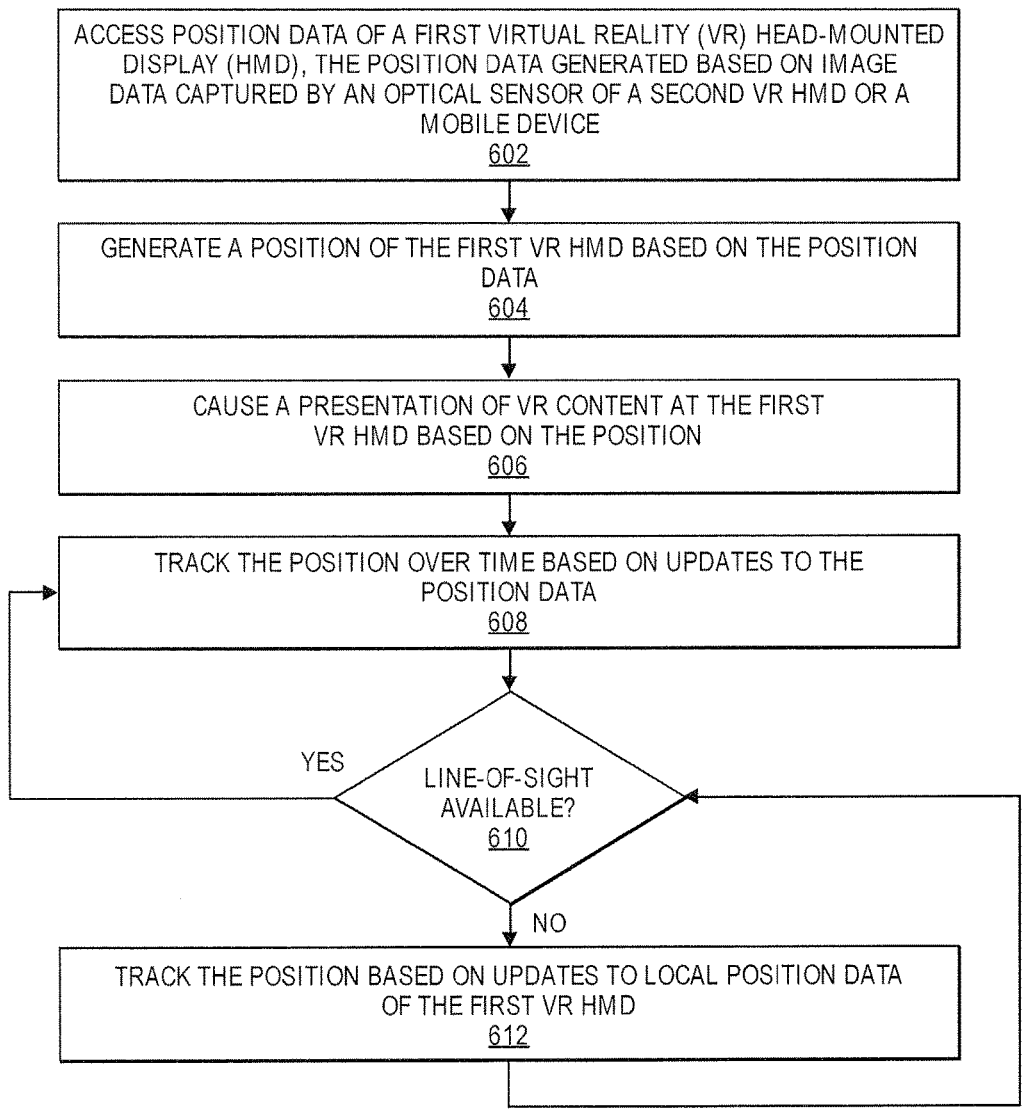
FIG. 6 illustrates an example flow for position tracking of a user operating a first VR HMD, according to embodiments of the present disclosure.

FIG. 6 illustrates an example flow for position tracking of a user operating a first VR HMD. The position tracking comprises determining a 3D physical position of the user, such as the user's head and tracking changes to the 3D physical position to determine translation motion and/or rotational motion. VR content is presented at the first VR HMD based on the translational and/or rotational motion. Generally, position data and image data is used for the positioning tracking. At least the image data is generated by another computing device that includes an optical sensor (or more, generally, a camera). This computing device can be a second VR HMD or a mobile device. The position tracking can be performed at the other computing device, locally at the first VR HMD of the user, at a central computer in data communication with the first VR HMD and the computing device, and/or distributed between such components. Accordingly, a computer system is illustrated as performing operations of the flow.

In an example, the computer system includes a processor and a memory coupled to the processor. The processor executes computer-readable instructions stored in the memory. The computer-readable instructions include instructions for performing the operations. In an example, the computer system is a component of the computing device, the first VR HMD of the user, the central computer, or is distributed between such components.

Although the operations are illustrated in a particular order, some of the operations can be re-ordered or omitted. Further, the flows described in connection with the next figures include example operations that can be implemented as sub-operations of the example flow of FIG. 6. Similarities between the operations across the figures is not repeated herein in the interest of clarity of explanation.

In an example, the flow includes an operation 602, where position data of the first VR HMD is accessed. For instance, the position data represents a 3D physical position of the first VR HMD in a physical environment at a point in time. The computer system generates the position data from image data captured by another computing device (e.g., the second VR HMD and/or the mobile device) in addition to local proximity data. The image data represents an image of the physical environment. The image can contain a snapshot of the first VR HMD. The local proximity data represents proximity data, such as inertial data, of the first VR HMD and the computing device. The computer system implements image processing techniques, speed measurements, speed offsets, and image reconstruction techniques to compute the position data.

In an example, the flow includes an operation 604, where a position of the first VR HMD is generated based on the position data. For instance, the position data is mapped to a 3D dimensional space to define the 3D physical position of the first VR HMD. If ground truth is available (e.g., based on a proximity device), the 3D physical position can be relative to the ground truth. Otherwise, the 3D physical position can be relative to a previously tracked position of the first HMD or relative to the 3D physical position of the computing device.

In an example, the flow includes an operation 606, where a presentation of VR content is caused at the first VR HMD based on the position. For instance, the computer system translated the 3D physical position to a 3D virtual position based on a physical-to-virtual space mapping. The VR content presented at the first VR HMD is accessed or set according to the 3D virtual position. For instance, if the user is looking upright, VR content corresponding to that upright position is presented.

In an example, the flow includes an operation 606, where the position is tracked over time based on updates to the position data. For instance, the computer system tracks changes over time by repeating operations 602 and 604. The tracked 3D physical position represents a motion of the user (e.g., the user's head) in the physical space, such as a translational and/or a rotational motion. The presentation of the VR content is updated such that the presented VR content corresponds to the translational and/or rotational motion.

In an example, the flow includes an operation 610, where a determination is made as to whether a line-of-sight exists between the first VR HMD and the computing device. If a line-of-sight exists, image data generated by the computing device correspond to images that show the first VR HMD. Accordingly, position tracking based on image data is possible. In such a case, operation 608 is typically followed to keep tracking the position based on the image data. If, however, a line-of-sight does not exist, the position tracking can no longer rely on the image data. In this case, operation 612 is typically followed.

In an example, the flow includes an operation 612, where the position is tracked based on local position data of the first VR HMD. The local proximity data includes inertial data and/or motion vector data generated by an IMU and a signal processor of the first VR HMD. Thus, the computer system no longer tracks changes to the 3D physical position (and, conversely, the motion) based on the image data. Instead, the 3D physical position (and the motion) is tracked from the local proximity data. Operation 612 can be repeated until the line-of-sight exists again.

Figure 7:
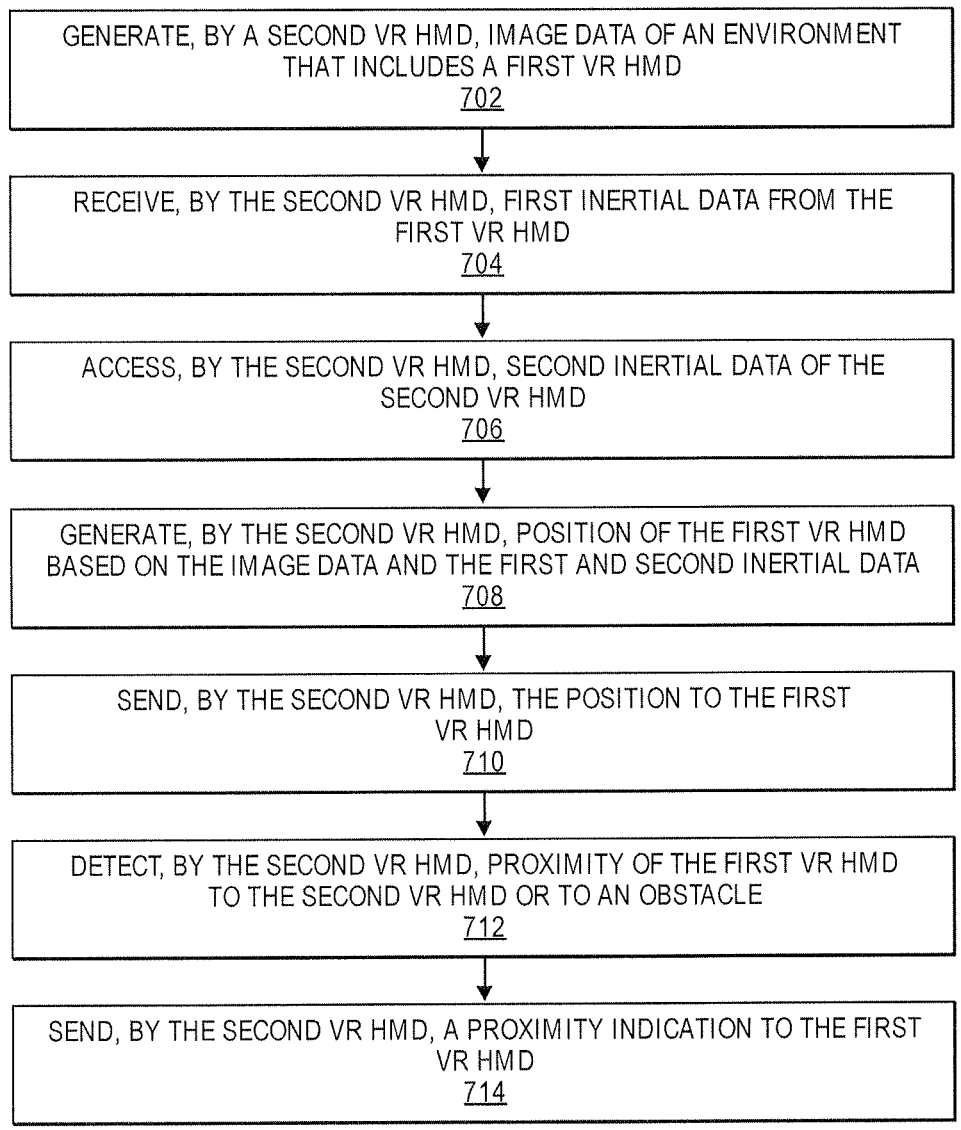
FIG. 7 illustrates an example flow for position tracking of a user operating a first VR HMD, where the positioning tracking is performed by a second VR HMD, according to embodiments of the present disclosure.

FIG. 7 illustrates an example flow for position tracking of a user operating a first VR HMD, where the positioning tracking is performed by a second VR HMD. A similar positioning tracking of a user operating the second VR HMD is possible at the first VR HMD. In addition, and in the interest of clarity of explanation, a single VR HMD is illustrated as tracking the position of a single user (or a single VR HMD that the user operates). However, the example flow can be similarly applied to track the single user by a larger number of VR HMDs.

In an example, the flow includes an operation 702, where image data of an environment that includes the first VR HMD is generated. For instance, the second VR HMD includes an optical sensor. The image data is generated by the optical sensor. The second VR HMD also includes other components of a camera, such as a signal processor configured to generate images from the image data. The images show the first VR HMD in the physical environment.

In an example, the flow includes an operation 704, where first inertial data is received from the first VR HMD. The first inertial data is an example of local position data that the first VR HMD sends to the second VR HMD over a data communication network. The first inertial data is generated by an IMU and signal processor of the first VR HMD and includes, for instance, roll, pitch, and yaw. Other possible local position data that the second VR HMD can receive includes vector motion data or other X, Y, Z positions of the first VR HMD.

In an example, the flow includes an operation 706, where second inertial data of the second VR HMD is accessed. For instance, the second inertial data is generated by an IMU and signal processor of the second VR HMD. The second VR HMD accesses such data from a local memory.

In an example, the flow includes an operation 708, where a position of the first VR HMD is generated based on the image data and the first and second inertial data. For instance, the second VR HMD determines an offset between the first inertial data and the second inertial data. The second VR HMD also applies image processing techniques to identify the first VR HMD in the images (or the image data). Geometric reconstruction is applied to the images and corrected based on the offset. Accordingly, the second VR HMD recognizes the current 3D physical position of the first VR HMD relative to a previous position from a previous image, relative to the second VR HMD, or relative to a reference point if ground truth is used. The change in 3D physical position across the images indicates a motion of the first VR HMD in the 3D space.

In an example, the flow includes an operation 710, where the position is sent to the first VR HMD. For instance, the second VR HMD transmits the position over a data communication network. The first VR HMD receives and maps the position to a 3D virtual space. VR content accessed by and/or presented at the first VR HMD depends on the 3D virtual position.

In an example, the flow includes an operation 712, where a proximity of the first VR HMD to the second VR HMD or to an obstacle is detected. For instance, the second VR HMD tracks changes to the 3D physical position of the first VR HMD over time based on additional image data and inertial data. That change represents a motion of the first HMD in the 3D physical space. The change can be expressed in a motion vector. Based on image processing techniques and geometric reconstruction applied to the additional image data, the second VR HMD updates the motion vector and detects proximity to the second VR HMD or to the obstacle based on relative distance and direction between the first VR HMD and such objects. If the distance crosses a threshold and/or the direction indicates a potential collision course, the second VR HMD generates a proximity indication. The proximity indication identifies the relative distance and direction and can suggest an adjustment (e.g., movement in the opposite direction) to avoid the potential collision.

In an example, the flow includes an operation 714, where the proximity indication is sent to the first VR HMD. For instance, the second VR HMD transmits the proximity indication over the data communication network. The first VR HMD receives and presents the proximity indication as an alert using different presentation modalities. If the proximity is to the second VR HMD, the second VR HMD also presents the proximity indication.

Figure 8:
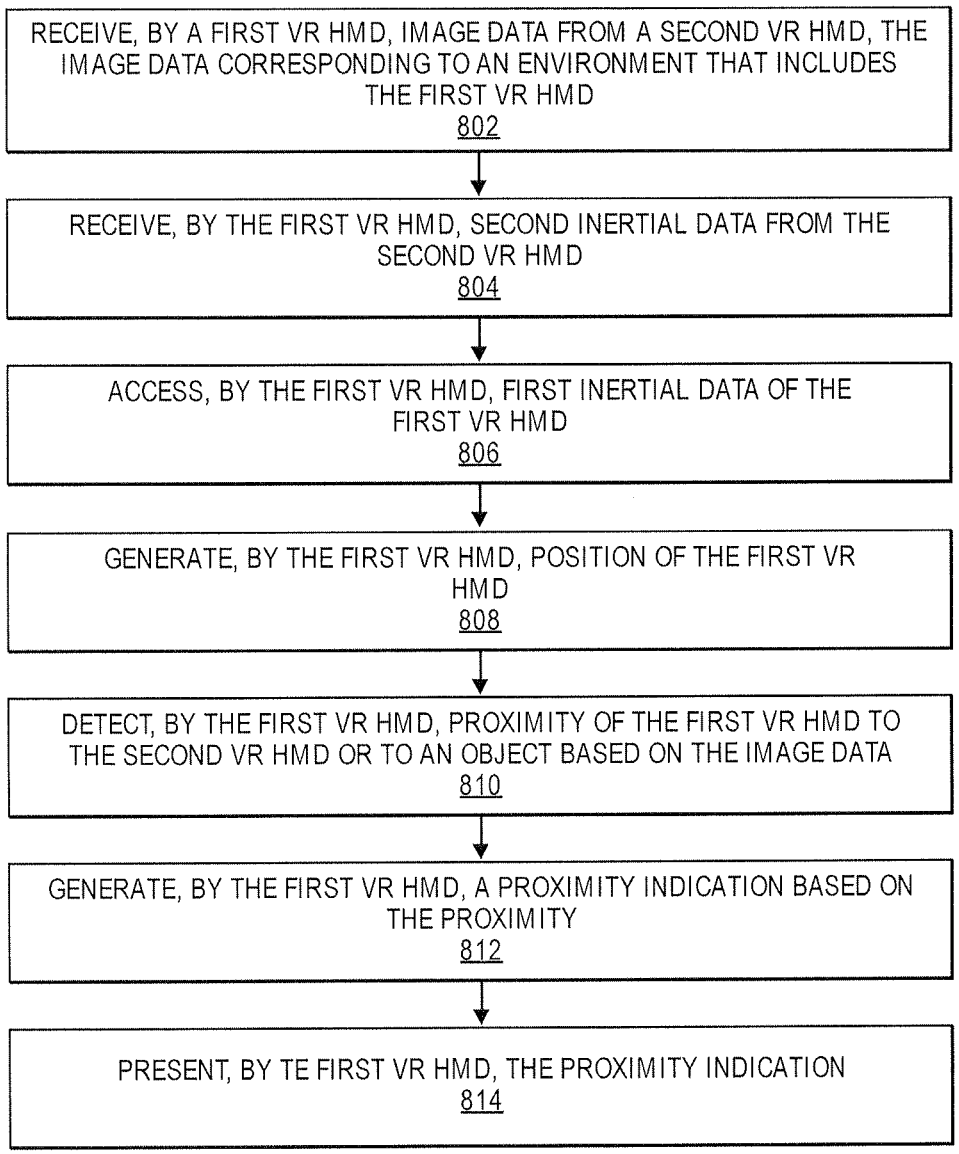
FIG. 8 illustrates an example flow for position tracking of a user operating a first VR HMD, where the positioning tracking is performed by the first VR HMD based on image data generated by and received from a second VR HMD, according to embodiments of the present disclosure.

FIG. 8 illustrates an example flow for position tracking of a user operating a first VR HMD, where the positioning tracking is performed by the first VR HMD based on image data generated by and received from a second VR HMD. A similar positioning tracking of a user operating the second VR HMD is also possible at the second VR HMD. In addition, and in the interest of clarity of explanation, a single VR HMD is illustrated as generating image data of a single user (or a single VR HMD that the user operates). However, the example flow can be similarly applied to generate the image data by a larger number of VR HMDs.

In an example, the flow includes an operation 802, where image data of an environment that includes the first VR HMD is received. For instance, the second VR HMD generates and transmits the image data (or corresponding images) over a data network. The first VR HMD receives the image data. The image data represents images of a physical environment that includes the first VR HMD.

In an example, the flow includes an operation 804, where second inertial data is received from the second VR HMD. For instance, the second VR HMD generates and transmits the second inertial data over the data network. The first VR HMD receives the second inertial data.

In an example, the flow includes an operation 806, where first inertial data of the first VR HMD is accessed. For instance, the first VR HMD accesses such data from a local memory.

In an example, the flow includes an operation 808, where a position of the first VR HMD is generated based on the image data and the first and second inertial data. For instance, the first VR HMD determines an offset between the first inertial data and the second inertial data. The first VR HMD also applies image processing techniques to identify the first VR HMD in the images (or the image data).

Geometric reconstruction is applied to the images and corrected based on the offset. Accordingly, the first VR HMD recognizes the current 3D physical position of the first VR HMD relative to a previous position from a previous image, relative to the second VR HMD, or relative to a reference point if ground truth is used. The change in the 3D physical position across the images indicates a motion of the first VR HMD in the 3D space.

In an example, the flow includes an operation 810, where a proximity of the first VR HMD to the second VR HMD or to an obstacle is detected. For instance, the first VR HMD tracks changes to the 3D physical position of the first VR HMD over time based on additional image data (or images) and inertial data received from the second VR HMD. That change represents a motion of the first HMD in the 3D physical space. The change can be expressed in a motion vector. Based on image processing techniques and geometric reconstruction applied to the additional image data generated, the first VR HMD updates the motion vector and detects proximity to the second VR HMD or to the obstacle based on relative distance and direction between the first VR HMD and such objects.

In an example, the flow includes an operation 812, where a proximity indication is generated based on the proximity. For instance, if the distance between the first VR HMD and any of the objects crosses a threshold and/or the direction indicates a potential collision course, the first VR HMD generates a proximity indication. The proximity indication identifies the relative distance and direction and can suggest an adjustment (e.g., movement in the opposite direction) to avoid the potential collision.

In an example, the flow includes an operation 814, where the proximity indication is presented at the first VR HMD. For instance, the first VR HMD presents the proximity indication as an alert using different presentation modalities. If the proximity is to the second VR HMD, the first VR HMD transmits the proximity indication to the second VR HMD over the data communication network for presentation at the second VR HMD.

Figure 9:
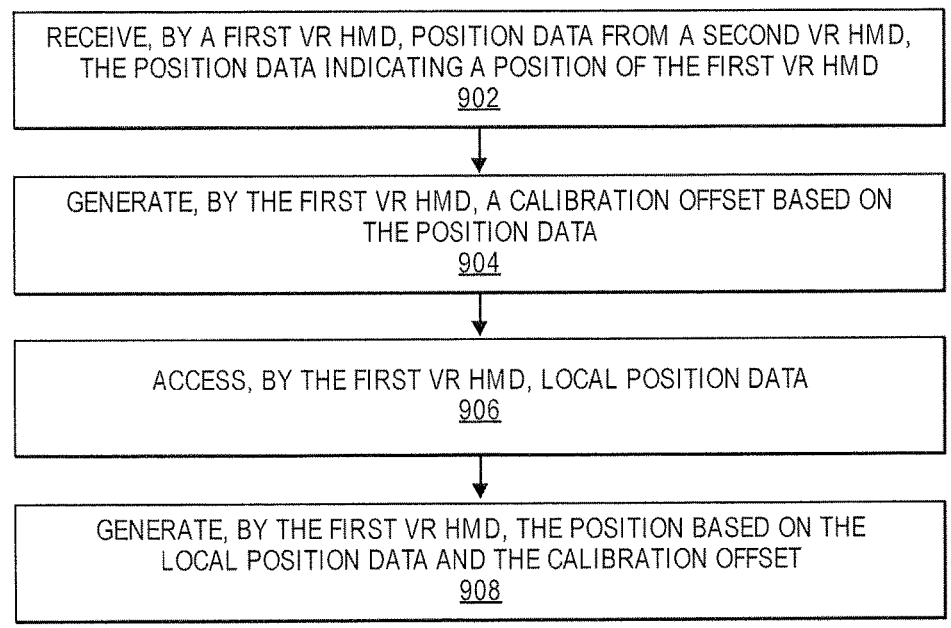
FIG. 9 illustrates an example flow for position tracking of a user operating a first VR HMD, where the positioning tracking is performed by the first VR HMD based on a calibration, and where the calibration is based on image data generated by a second VR HMD, according to embodiments of the present disclosure.

FIG. 9 illustrates an example flow for position tracking of a user operating a first VR HMD, where the positioning tracking is performed by the first VR HMD based on a calibration, and where the calibration is based on image data generated by a second VR HMD. A similar positioning tracking of a user operating the second VR HMD is also possible at the second VR HMD. In addition, and in the interest of clarity of explanation, a single VR HMD is illustrated as generating image data of a single user (or a single VR HMD that the user operates). However, the example flow can be similarly applied to generate the image data by a larger number of VR HMDs.

In an example, the flow includes an operation 902, where position data is received from the second VR HMD. For instance, the first VR HMD receives the position data over a data network. In an illustration, the position data includes the 3D physical position of the first VR HMD, as described in connection with FIG. 7. In another illustration, the position data includes the image data and the inertial data of the second VR HMD, as described in connection with FIG. 8.

In an example, the flow includes an operation 904, where a calibration offset is generated from the position data. For instance, the first VR HMD computes its own 3D physical position (or equivalent position data along the different dimensional axes) from first local position data (e.g., inertial data and/or motion vector data local to the first VR HMD). The first VR HMD compares this computed 3D physical position (or the equivalent position data) to the received 3D physical data (or the received position data) to generate the calibration offset. The calibration offset can be used to correct for drift in the sensors of the first VR HMD, such as in the sensors of its IMU.

In an example, the flow includes an operation 906, where second local position data is accessed. For instance, the first VR HMD accesses the second local position data from a memory of the first VR HMD. This second local position data can correspond to a subsequent position (e.g., at a subsequent time) of the first VR HMD relative to the first local position data used for the calibration at operation 904. In such a case, the subsequent position is generated at operation 908. Alternatively, the second local position data corresponds to the first local position data. In this case, the operation 908 is performed to refine or increase the fidelity of the position determined at operation 904.

In an example, the flow includes an operation 908, where the position (subsequent, current, or previous depending on the second local position data) of the first VR HMD is generated based on the local position data and the calibration offset. For instance, the first VR HMD generates the 3D physical position in the 3D space based on the inertial data and/or the motion vector data and refines his 3D physical position by applying the calibration offset.

Figure 10:
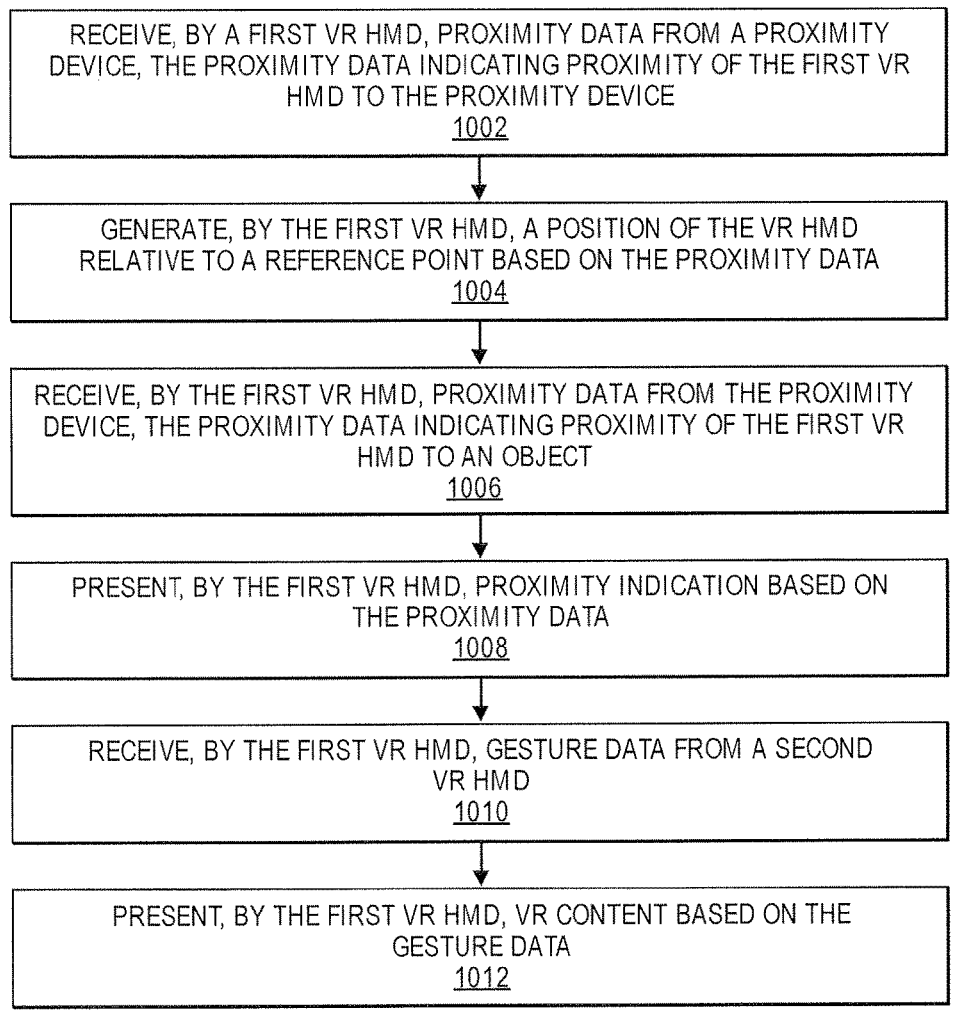
FIG. 10 illustrates an example flow for position tracking of a user operating a first VR HMD, where the positioning tracking is performed in part based on data generated by and received from a proximity device and a gesture device, according to embodiments of the present disclosure.

FIG. 10 illustrates an example flow for position tracking of a user operating a first VR HMD, where the positioning tracking is performed in part based on data generated by and received from a proximity device and a gesture device. A similar positioning tracking of a user operating a second VR HMD is also possible at the second VR HMD. In addition, and in the interest of clarity of explanation, a single proximity device and a single gesture device are illustrate. However, the example flow can be similarly applied to for a larger number of such devices.

In an example, the flow includes an operation 1002, where proximity data is received from the proximity device. For instance, the proximity device transmits the proximity data over a data network. In turn, the first VR HMD receives the proximity data over the data network. The proximity data indicates proximity of the first VR HMD to the proximity device. The proximity can be expressed as a distance and direction between the two devices. In an example, an active proximity device is used to measure the proximity. In an another example, a passive proximity device is used. In this example, rather than receiving the proximity from the proximity device, the first VR HMD captures images or reads machine-readable code encoded on the passive proximity device. The captured image data or the read encoded data includes proximity-related data that enables the first VR HMD to measure the proximity (e.g., based on geometric reconstruction).

In an example, the flow includes an operation 1004, where a position of the first VR HMD is generated relative to a reference point based on the proximity data. For instance, the reference point represents a 3D location of the proximity device in the physical environment. A relative 3D physical position can be determined based on interactions between the first VR HMD and a second VR HMD as described in any of the flows of FIGS. 7, 8, and 9. The first VR HMD (or, equivalently, the second VR HMD) maps the relative 3D physical position to 3D physical position references according to the reference point based on the proximity (e.g., the distance and direction to the proximity device). This represents applying a ground truth to the 3D physical location.

In an example, the flow includes an operation 1006, where additional proximity data is received from the proximity device. The additional proximity data indicates proximity of the first VR HMD to an object, such as to a perimeter of an area within which the proximity monitoring is performed, to a physical obstacle presenting a potential obstacle, or to the second VR HMD. If the proximity data indicates an unacceptable proximity (e.g., distance less than a threshold, and direction indicating a collision course), the first VR HMD (or, similarly, the proximity device) can generate a proximity indication. The proximity indication identifies the proximity to the object and can suggest an adjustment to avoid the potential collision (or the potential crossing of the perimeter).

In an example, the flow includes an operation 1008, where the proximity indication is presented. For instance, the first VR HMD presents the proximity indication as an alert using one or more presentation modalities.

In an example, the flow includes an operation 1010, where gesture data is received from the second VR HMD. For instance, the a user of the first VR HMD wears a wearable gesture device (active or passive). The second VR HMD captures and analyzes image data of the wearable gesture device (and any other available position data from the wearable gesture device, the first VR HMD, and/or the second VR HMD) to identify gestures. The second VR HMD sends gesture data about these gestures to the first VR HMD over a data network.

In an example, the flow includes an operation 1012, where VR content is presented at the first VR HMD based on the gesture data. For instance, mapping of physical-to-virtual space gesture mapping can be maintained. The gesture data (or the gestures in the physical environment) are translated into virtual gestures in the virtual environment. VR content is accessed or presented according to the virtual gestures. To illustrate, if the virtual gesture is to hit a tennis ball with a tennis racket, the VR content shows that gesture as being performed.

Figure 11:
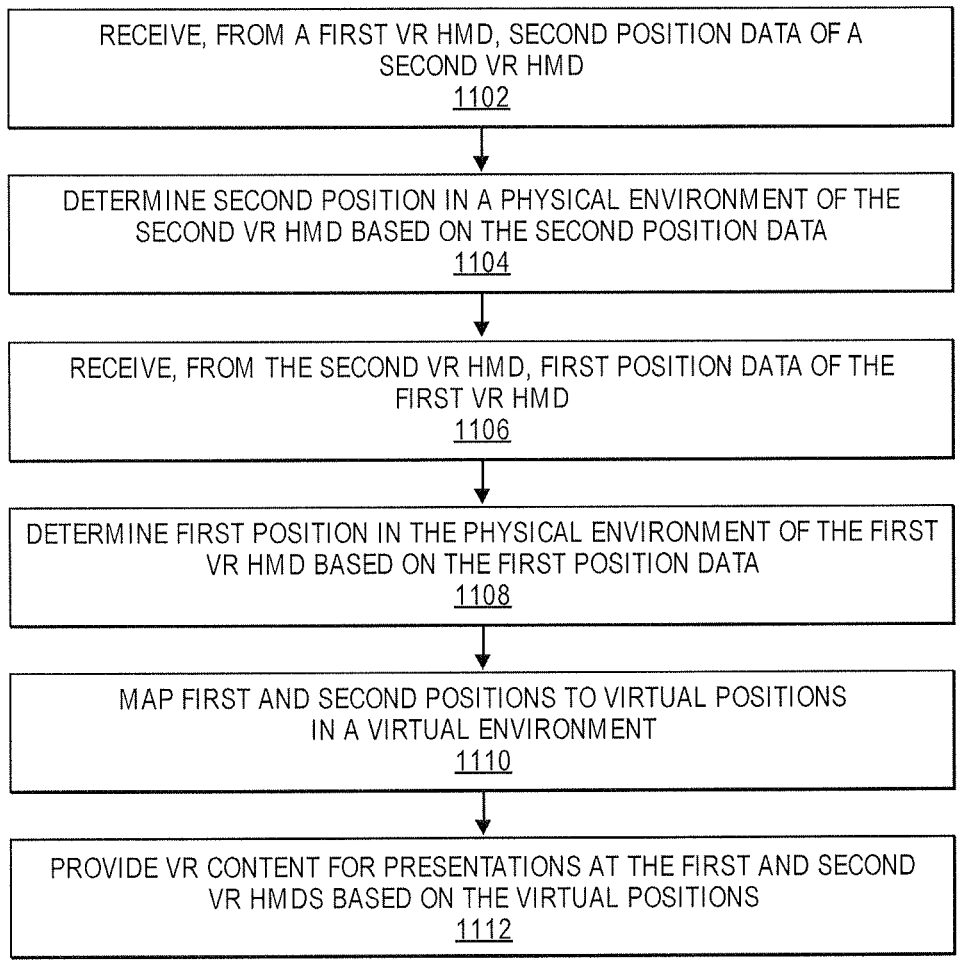
FIG. 11 illustrates an example flow for position tracking of users operating VR HMDs relative to each other, according to embodiments of the present disclosure.

FIG. 11 illustrates an example flow for position tracking of users operating VR HMDs relative to each other. In the interest of clarity of explanation, operations of the example flow are described in connection with a first VR HMD and a second VR HMD. However, the example flow can be similarly applied to a larger number of VR HMDs. In addition, a computer system is illustrated as performing the operations. Different architectures for the computer system are possible. For example, the computer system is a component of the first VR HMD, the second VR HMD, a central computer, or is distributed between such components.

In an example, the flow includes an operation 1102, where second position data of the second VR HMD is received. For instance, the second position data is generated by the first VR HMD based on any of the example flows described in connection with FIGS. 6-10. As applicable depending on the architecture of the computer system, the first VR HMD sends the position data to the computer system over a data network.

In an example, the flow includes an operation 1104, where a second position in a physical environment of the second VR HMD is determined based on the second position data. For instance, the second position data includes the 3D physical position of the second VR HMD (relative to the first VR HMD or relative to a reference point in the physical environment). Accordingly, the computer system identifies the 3D physical position from the second position data. In another illustration, the second position data includes inertial data, image data, and/or proximity data. In this case, the computer system generates the 3D physical position from such data.

In an example, the flow includes an operation 1106, where first position data of the first VR HMD is received. This operation can be similar to operation 1102, where the second VR HMD generates and sends the first position data.

In an example, the flow includes an operation 1108, where a first position in the physical environment of the first VR HMD is determined based on the first position data. This operation can be similar to operation 1104, where the computer system identifies or generates the 3D physical position of the first VR HMD from the first position data.

In an example, the flow includes an operation 1110, where the first position and the second position from the physical environment are mapped to respective virtual positions in a virtual environment. For instance, the computer system applies a physical-to-virtual space mapping to the first 3D physical position to generate a first 3D virtual position for the first VR HMD. Similarly, the computer system applies the same or different physical-to-virtual space mapping (e.g., depending on the VR content, user preference, etc.) to generate a second virtual position for the second VR HMD. The two virtual positions can be expressed as relative positions to each other. If ground truth is used, the two virtual positions can additionally or alternatively be expressed as relative to a virtual reference point in the virtual environment.

In an example, the flow includes an operation 1112, where VR content is provided for presentations at the first VR HMD and the second VR HMD based on the virtual positions. For instance, the VR content presented at the first VR HMD can present an indication or can show the second virtual position of the second VR HMD relative to a virtual point of view of the first VR HMD. In another illustration, in a multiplayer video game, each virtual player can be shown a view of the VR content that identifies the other virtual player or indicates the position of the other virtual player.

Figure 12:
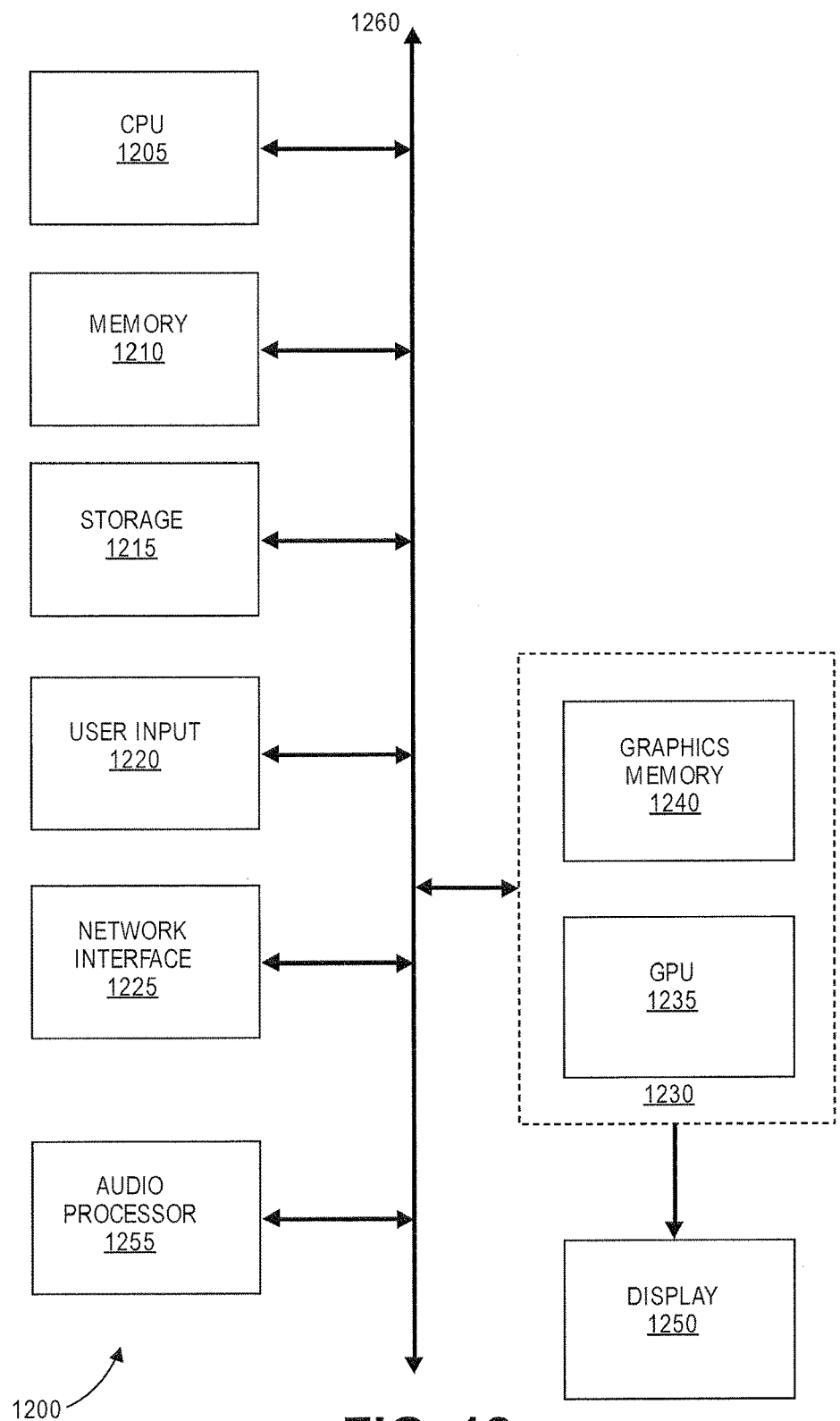
FIG. 12 illustrates an example of a hardware system suitable for implementing a computer system, according to embodiments of the present disclosure.

FIG. 12 illustrates an example of a hardware system suitable for implementing a computer system 1200 in accordance with various embodiments. The computer system 1200 represents, for example, components of a VR HMD, a mobile device, a proximity device, a wearable gesture device, and/or a central computer. The computer system 1200 includes a central processing unit (CPU) 1205 for running software applications and optionally an operating system. The CPU 1205 may be made up of one or more homogeneous or heterogeneous processing cores. Memory 1210 stores applications and data for use by the CPU 1205. Storage 1215 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1220 communicate user inputs from one or more users to the computer system 1200, examples of which may include keyboards, mice, joysticks, touch pads, touch screens, still or video cameras, and/or microphones. Network interface 1225 allows the computer system 1200 to communicate with other computer systems via an electronic communications network, and may include wired or wireless communication over local area networks and wide area networks such as the Internet. An audio processor 1255 is adapted to generate analog or digital audio output from instructions and/or data provided by the CPU 1205, memory 1210, and/or storage 1215. The components of computer system 1200, including the CPU 1205, memory 1210, data storage 1215, user input devices 1220, network interface 1225, and audio processor 1255 are connected via one or more data buses 1260.

A graphics subsystem 1230 is further connected with the data bus 1260 and the components of the computer system 1200. The graphics subsystem 1230 includes a graphics processing unit (GPU) 1235 and graphics memory 1240. The graphics memory 1240 includes a display memory (e.g., a frame buffer) used for storing pixel data for each pixel of an output image. The graphics memory 1240 can be integrated in the same device as the GPU 1235, connected as a separate device with the GPU 1235, and/or implemented within the memory 1210. Pixel data can be provided to the graphics memory 1240 directly from the CPU 1205. Alternatively, the CPU 1205 provides the GPU 1235 with data and/or instructions defining the desired output images, from which the GPU 1235 generates the pixel data of one or more output images. The data and/or instructions defining the desired output images can be stored in the memory 1210 and/or graphics memory 1240. In an embodiment, the GPU 1235 includes 3D rendering capabilities for generating pixel data for output images from instructions and data defining the geometry, lighting, shading, texturing, motion, and/or camera parameters for a scene. The GPU 1235 can further include one or more programmable execution units capable of executing shader programs.

The graphics subsystem 1230 periodically outputs pixel data for an image from the graphics memory 1240 to be displayed on the display device 1250. The display device 1250 can be any device capable of displaying visual information in response to a signal from the computer system 1200, including CRT, LCD, plasma, and OLED displays. The computer system 1200 can provide the display device 1250 with an analog or digital signal.

In accordance with various embodiments, the CPU 1205 is one or more general-purpose microprocessors having one or more processing cores. Further embodiments can be implemented using one or more CPUs 1205 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A computer-implemented method comprising:
   accessing, by a computer system, inertial data of a first virtual reality head-mounted display and image data of a physical environment that comprises the first virtual reality head-mounted display, the image data generated by an optical sensor of a second virtual reality head-mounted display;
   determining, by the computer system, a directional speed of the first virtual reality head-mounted display based on the inertial data;
   determining, by the computer system, a traveled distance and a direction of the traveled distance based on changes in pixel location of the first virtual reality head-mounted display in the image data;
   determining, by the computer system, a position of the first virtual reality head-mounted display in the physical environment based on the directional speed, the traveled distance, and the direction of the traveled distance; and
   causing, by the computer system, a presentation of virtual reality content at the first virtual reality head-mounted display based on the position in the physical environment.

2. The computer-implemented method of claim 1, wherein the first virtual reality head-mounted display comprises the computer system, wherein accessing the inertial data comprises receiving the inertial data from the second virtual reality head-mounted display over a peer-to-peer data communication network, and wherein the position of the first virtual reality head-mounted display is tracked over time based on updates to the inertial data.

3. The computer-implemented method of claim 2, wherein the inertial data is generated by an inertial measurement unit rigidly connected with the first virtual reality head-mounted display.

4. The computer-implemented method of claim 1, wherein a motion of the first virtual reality head-mounted display is generated based on tracking the position over time, wherein the motion comprises translational motion and rotational motion, and wherein the virtual reality content is presented at the first virtual reality head-mounted display based on the translational motion and the rotational motion.

5. The computer-implemented method of claim 1, wherein the first virtual reality head-mounted display comprises a two dimensional machine-readable code that identifies the first virtual reality head-mounted display and that identifies a proportional dimension, wherein the inertial data is generated by the second virtual reality head-mounted display based on identifying the proportional dimension from the image data.

6. The computer-implemented method of claim 1, wherein the first virtual reality head-mounted display comprises the computer system, and further comprising:
   sending, by the computer system, the inertial data to the second virtual reality head-mounted display; and
   receiving, by the computer system, the position from the second virtual reality head-mounted display based on the inertial data being sent.

7. The computer-implemented method of claim 1, wherein the first virtual reality head-mounted display comprises the computer system, and further comprising:
   receiving, by the computer system, the image data from the second virtual reality head-mounted display; and
   generating, by the computer system, position data indicating the position based on the received image data and based on inertial data of the first virtual reality head-mounted display.

8. The computer-implemented method of claim 1, wherein the first virtual reality head-mounted display comprises the computer system and an inertial measurement unit coupled with the computer system, and wherein determining the position comprises:
   generating, by the inertial measurement unit, the inertial data of the first virtual reality head-mounted display;
   generating, by the computer system, a calibration offset based on second inertial data sent from the second virtual reality head-mounted display; and
   generating, by the computer system, the position based on the inertial data of the first virtual reality head-mounted display and the calibration offset.

9. A computer system comprising:
   a processor; and
   a memory storing computer-readable instructions that, upon execution by the processor, configure the computer system to:
      access inertial data of a first virtual reality head-mounted display and image data of a physical environment that comprises the first virtual reality head-mounted display, the image data generated by an optical sensor of a second virtual reality head-mounted display;
      determine a directional speed of the first virtual reality head-mounted display based on the inertial data;
      determine a traveled distance and a direction of the traveled distance based on changes in pixel location of the first virtual reality head-mounted display in the image data;
      determine a position of the first virtual reality head-mounted display in the physical environment based on the directional speed, the traveled distance, and the direction of the traveled distance; and
      cause a presentation of virtual reality content at the first virtual reality head-mounted display based on the position in the physical environment.

10. The computer system of claim 9, wherein the first virtual reality head-mounted display comprises the computer system, wherein accessing the inertial data comprises receiving the inertial data from the second virtual reality head-mounted display over a peer-to-peer data communication network, and wherein the position of the first virtual reality head-mounted display is tracked over time based on updates to the inertial data.

11. The computer system of claim 10, wherein the inertial data is generated by an inertial measurement unit rigidly connected with the first virtual reality head-mounted display.

12. The computer system of claim 9, wherein a motion of the first virtual reality head-mounted display is generated based on tracking the position over time, wherein the motion comprises translational motion and rotational motion, and wherein the virtual reality content is presented at the first virtual reality head-mounted display based on the translational motion and the rotational motion.

13. The computer system of claim 9, wherein the first virtual reality head-mounted display comprises a two dimensional machine-readable code that identifies the first virtual reality head-mounted display and that identifies a proportional dimension, wherein the inertial data is generated by the second virtual reality head-mounted display based on identifying the proportional dimension from the image data.

14. The computer system of claim 9, wherein the first virtual reality head-mounted display comprises the computer system, and wherein the computer-readable instructions further configure the computer system to:
send the inertial data to the second virtual reality head-mounted display; and
receive the position from the second virtual reality head-mounted display based on the inertial data being sent.

15. The computer system of claim 9, wherein the first virtual reality head-mounted display comprises the computer system, and wherein the computer-readable instructions further configure the computer system to:
receive the image data from the second virtual reality head-mounted display; and
generate position data indicating the position based on the received image data and based on inertial data of the first virtual reality head-mounted display.

16. The computer system of claim 9, wherein the first virtual reality head-mounted display comprises the computer system and an inertial measurement unit coupled with the computer system, and wherein determining the position comprises:
generating, by the inertial measurement unit, the inertial data of the first virtual reality head-mounted display;
generating, by the computer system, a calibration offset based on second inertial data sent from the second virtual reality head-mounted display; and
generating, by the computer system, the position based on the inertial data of the first virtual reality head-mounted display and the calibration offset.

17. A non-transitory computer readable medium storing computer-readable instructions that, upon execution on a computer system, cause the computer system to perform operations comprising:
accessing inertial data of a first virtual reality head-mounted display and image data of a physical environment that comprises the first virtual reality head-mounted display, the image data generated by an optical sensor of a second virtual reality head-mounted display;
determining a directional speed of the first virtual reality head-mounted display based on the inertial data;
determining a traveled distance and a direction of the traveled distance based on changes in pixel location of the first virtual reality head-mounted display in the image data;
determining a position of the first virtual reality head-mounted display in the physical environment based on the directional speed, the traveled distance, and the direction of the traveled distance; and
causing a presentation of virtual reality content at the first virtual reality head-mounted display based on the position in the physical environment.

18. The non-transitory computer readable medium of claim 17, wherein the first virtual reality head-mounted display comprises the computer system, wherein accessing the inertial data comprises receiving the inertial data from the second virtual reality head-mounted display over a peer-to-peer data communication network, and wherein the position of the first virtual reality head-mounted display is tracked over time based on updates to the inertial data.

19. The non-transitory computer readable medium of claim 18, wherein the inertial data is generated by an inertial measurement unit rigidly connected with the first virtual reality head-mounted display.

20. The non-transitory computer readable medium of claim 17, wherein a motion of the first virtual reality head-mounted display is generated based on tracking the position over time, wherein the motion comprises translational motion and rotational motion, and wherein the virtual reality content is presented at the first virtual reality head-mounted display based on the translational motion and the rotational motion.

* * * * *